United States Patent Office
3,420,891
Patented Jan. 7, 1969

3,420,891
TRIS-PEROXIDES FROM 1,3,5-TRIISOPROPYL-
BENZENE
Orville Leonard Mageli, Buffalo, and Richard Anthony
Bafford, Tonawanda, N.Y., assignors to Wallace &
Tiernan Inc., East Orange, N.J., a corporation of
Delaware
No Drawing. Filed Dec. 8, 1966, Ser. No. 600,052
U.S. Cl. 260—610                                    5 Claims
Int. Cl. C07c 73/00

ABSTRACT OF THE DISCLOSURE

Tris-peroxides derived from 1,3,5-triisopropylbenzene, having the formula:

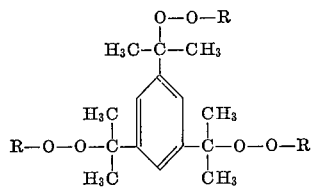

where R is an alkyl radical of from 1–8 carbon atoms, are disclosed. Crosslinked polymeric materials prepared using these tris-peroxides as crosslinking agents, exhibit none of the odor or blooming problems associated with other peroxides.

Background of the invention

This invention relates to tris alkylperoxy derivatives of 1,3,5-triisopropylbenzene and their use as crosslinking (vulcanizing) agents.

The use of alpha,alpha'-bis(t-butylperoxy) diisopropylbenzene and of alpha,alpha-dimethyl-benzyl peroxide for crosslinking (vulcanizing) polymeric materials such as polyolefins and elastomers is known. The crosslinked products, obtained using commercially available peroxides such as alpha,alpha'-bis(t-butylperoxy) paradiisopropylbenzene, develop a bloom on aging i.e. a progressive formation of a thin-white veil, or layer, of solid (crystalline) material on the surface of the crosslinked material. Canada Patent No. 704,507 discusses this problem. It is thought that decomposition products of the peroxide migrate to the surface and these cause the bloom. Also an objectionable odor is present in the cured product when alpha, alpha-dimethylbenzyl peroxide (dicumyl peroxide) is used as the crosslinking agent.

Summary of the invention

It has now been discovered that the tris-peroxides of the invention, as defined in Formula I below, when used as crosslinking (vulcanizing) agents, eliminate the blooming and/or odor problems associated with prior art agents. Also, it has been observed that tris-peroxy compounds of the invention are in many cases superior to prior art aralkyl-peroxy compounds, in their crosslinking (vulcanizing) ability and efficiency. Tertiary alkyl peroxy derivatives being especially effective.

The compounds of this invention have the general formula:
(I)

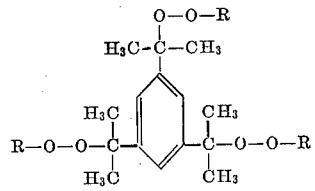

where R is an alkyl radical having from 1 to 8 carbon atoms, preferably a tertiary-alkyl radical of from 4 to 8 carbon atoms. When R is a primary alkyl radical, R may be for example: methyl, ethyl, propyl, butyl, pentyl, hexyl, heptyl or octyl. Among the preferred group of tertiary radicals are t-butyl, t-amyl(t-pentyl), and 1,1,3.3-tetramethylbutyl.

DESCRIPTION AND EMBODIMENTS

Preparation

The novel peroxides of this invention, all derivable from triisopropylbenzene, may be prepared by a number of methods known to the art.

Method A.—The reaction of an aralkyl hydroperoxide and the appropriate alcohol, catalyzed by perchloric acid as disclosed in British Patent 792,558 published Mar. 26, 1958; British Patent 928,695 published June 12, 1963; and Belgian Patent 656,122, Nov. 23, 1964.

Method B.—The mineral acid catalyzed reaction of 1,3,5-tris[alpha,alpha - dimethyl - alpha - hydroxymethyl] benzene and the desired t-alkyl hydroperoxide as disclosed in Milas U.S. 2,223,807 issued Dec. 3, 1940.

Method C.—The transition metal salt catalyzed decomposition of a t-alkyl hydroperoxide in the presence of 1,3,5-triisopropylbenzene as disclosed in Kharasch and Fono, J. Org. Chem. 23, 324 (1958); and Farkas U.S. Patent No. 2,994,719 issued Aug. 1, 1966.

Method D.—Primary tris peroxides may be prepared by the reaction of the sodium salt of the trihydroperoxide and the desired dialkylsulfate as disclosed in Rust et al., J. Am. Chem. Soc. 72, 338 (1950).

Of interest in regard to the preparation of hydroperoxides of triisopropylbenzene are: Shepard, U.S. Patent No. 2,790,010 issued Apr. 23, 1957 and Thompson, British Patent No. 746,388, Mar. 14, 1956.

Example 1

1,3,5-tris - [alpha,alpha-dimethyl-alpha-(t-butylperoxy) methyl]benzene has the structure

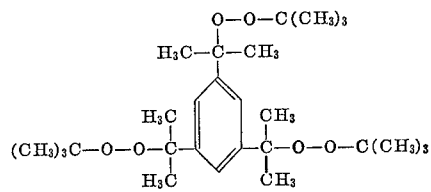

(II)

It was prepared by both aforesaid Methods B and C.

Preparation of II by Method B

Into a jacketed reactor, provided with means for circulating coolant, and fitted with a thermometer, addition funnel and mechanical stirrer, was charged 63 grams of 70% aqueous sulfuric acid (0.45 mole). Ice water was circulated through the reactor jacket, and 60 grams of 90% t-butyl hydroperoxide (0.60 mole) were added dropwise with stirring. Cyclohexane (20 ml.) was added, and 37.8 grams of 1,3,5-tris-[alpha,alpha-dimethyl-alpha-hydroxymethyl]benzene (0.15 mole) were added in small portions at 0°–2° C. Additional cyclohexane (30 ml.) was added to facilitate stirring. After all the reactants were added, the reaction mixture was stirred at 0° C. for 1.0 hour, and for an additional 4 hours at about 10° C.

The reaction product mixture was then diluted with water, and separated. The organic phase was washed once with 10% aqueous sodium carbonate, three times with 10% aqueous potassium hydroxide, and then with water until the washings were neutral. After drying over anhydrous magnesium sulfate, the organic phase was filtered, and the cyclohexane removed under reduced pressure.

A yellowish oil, 61.5 grams, an 87.6% yield of the desired product was obtained.

$n_D^{25}$ 1.4664.—Theoretical: C 69.25%; H 10.32%. Found: C 66.8%; H 9.6%.

Preparation of II by Method C

Into a 100 ml. reactor, provided with means for heating contents, and equipped with a hollow stirrer, thermometer, and addition funnel, was charged 10.8 grams (0.05 mole) of 1,3,5-triisopropylbenzene, 40 ml. of water and 0.05 gram of cupric chloride dihydrate. The mixture was heated to 80° with stirring while introducing nitrogen slowly through the hollow stirrer. Thirty grams (0.30 mole) of 90% t-butyl-hydroperoxide were consumed (aliquots of reaction mixture were titrated iodometrically). After the first 20 hours heating another 0.05 gram portion of cupric chloride dihydrate was added and a final 0.05 gram portion after 25 hours of heating.

The reaction product mixture was cooled and transferred to a separatory funnel and the aqueous layer was removed. The organic layer was diluted with 25 ml. of ether and then washed once with 50 ml. of water, then 50 ml. of 1% aqueous sulfuric acid and finally with 50 ml. of water.

The organic layer was separated, dried over anhydrous sodium sulfate and filtered. The solvent was removed under vacuum and 9.4 grams of a viscous yellowish oil, 40% yield, was obtained.

The infrared spectrum of this product was identical with that of the product obtained using Method B.

Example 2

1,3,5 - tris-[alpha,alpha-dimethyl-alpha-(1,1,3,3 - tetramethylbutylperoxy)methyl]benzene has the structure (III)

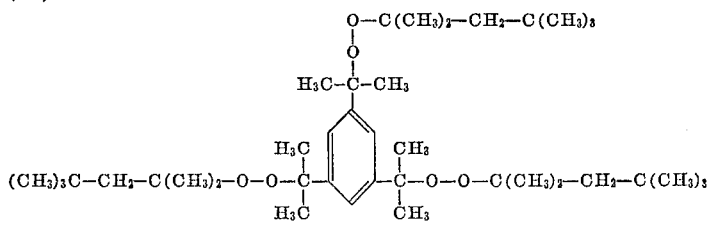

It was prepared using Method B.

Into a jacketed reactor, provided with a means for circulating coolant, and fitted with a thermometer, addition funnel, and mechanical stirrer was charged 63 grams of 70% aqueous sulfuric acid (0.45 mole). Ice water was circulated through the reactor jacket, and 89.6 grams of 91.1% 1,1,3,3 - tetramethylbutyl hydroperoxide (0.60 mole), was added dropwise with stirring at 0°–10° C. 1,3,5-tris - [alpha,alpha-dimethyl-alpha - hydroxymethyl] benzene, 37.8 grams (0.15 mole) was added portionwise at 10°–15° C. A total of 70 ml. of cyclohexane was added to facilitate stirring during this addition. Stirring was continued at 10–15° C. overnight.

The reaction mixture was diluted with water and the aqueous phase separated. The organic phase was washed once with 10% aqueous sodium carbonate, three times with 10% aqueous potassium hydroxide, and then with water until the washings were neutral.

The organic phase was dried over anhydrous magnesium sulfate, filtered and the solvent removed under vacuum. A viscous brownish liquid (35.0 grams) or 36.8% yield of the desired product (compound III) was obtained.

$n_D^{25}$ 1.4761.—Theoretical: C 73.52%; H 11.38%. Found: C 76.0%; H 11.3%.

The infrared spectrum showed no hydroxyl band, and had the characteristic peroxide band.

Example 3

1,3,5-tris-[alpha,alpha-dimethyl-alpha - (ethylperoxy)-methyl]benzene has the structure (IV)

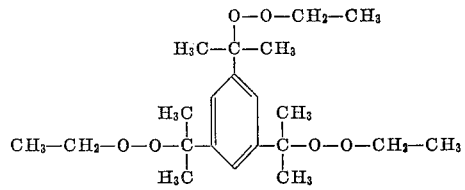

Method D was used in the preparation of this compound. Into a jacketed reactor, provided with means for circulating coolant, and equipped with stirrer and thermometer, was placed 30 ml. of water in which was dissolved 12.35 grams (0.19 mole) of 5% potassium hydroxide. Ice water was circulated through the jacket while 19.2 grams (0.06 mole) of 1,3,5 - tris[alpha,alpha-dimethyl - alpha - hydroperoxymethyl]benzene was slowly added. To the above reaction mixture was added over a one hour period 15.4 grams (0.1 mole) of diethyl sulfate. Stirring was continued for an additional six hours. The organic layer was separated, and the aqueous layer extracted with two 30 ml. portions of ethyl ether. The ether extracts and the organic layer were combined, washed with water and dried over anhydrous sodium sulfate.

After stripping under vacuum, 19.76 grams of a pale yellow limpid oil was obtained. $n_D^{25}$ 1.4766. An examination of the infra red spectrum showed that the structure obtained was necessarily that shown of IV above.

Compositions and method

The defined tris - peroxy compounds are effective crosslinking (vulcanizing) agents for polymeric materials which are capable of being crosslinked to form a thermoset material. Herein the words of art "crosslinking" and "vulcanizing" are used as synonyms.

According to the present invention there is provided an improved method for the crosslinking of filled or unfilled polymeric materials which method comprises heating said polymeric material, and an amount of 1,3,5 - tris[alpha, alpha - dimethyl - alpha - (alkylperoxy)methyl]benzene sufficient to achieve the desired degree of crosslinking. The improved method essentially eliminates the blooming and/or odor problems associated with the use of prior art aralkyl peroxide crosslinking agents.

Polymeric materials

The polymeric materials include those natural and synthetic materials which are thermoplastic or have indefinite melting points and which can be transformed to thermoset materials—elastic, or more or less rigid solids—by a crosslinking (curing) reaction, through the action of an added agent.

Illustrative classes of operable polymeric compounds are: The solid polyolefins such as polyethylene; and polybutenes. The elastomers such as natural rubber and the synthetic rubbers including butyl rubber, GR–S rubber, neoprene, acrylic rubber, Buna rubber, ethylene-propylene rubber and the silicone rubbers and miscellaneous "elastomers such as polybutenestyrene copolymers, and urethane rubber. The polymers may contain plasticizers and/or oil extenders.

Crosslinkable compositions

An intimate mixture of the defined polymeric material and the tris-peroxide of this invention can be stored until needed. The mixture can be heat cured in reasonable times at reasonable temperatures to a crosslinked (vulcanized) material. The temperature and time are controlled, and sufficient agent used to afford the desired degree of crosslinking at these conditions.

In addition to the defined polymeric material and the defined tris - peroxide in initimate mixture, the crosslinkable composition may contain co-agents such as sulfur, promoters, coupling agents, fillers, reinforcing materials, and any other material conventionally used in the production of a crosslinked composition. Desirable fillers are carbon blacks, titanium dioxide, calcium silicate, and the alkaline earth metal carbonates. Neutral or alkaline carbon blacks are the preferred carbon blacks.

Crosslinked composition

The crosslinkable composition is heat cured for a time sufficient to obtain the desired degree of crosslinking. The heat curing has a temperature-time relationship which is primarily dependent on the polymeric material and the peroxide present but is affected by the formulation as a whole. It is customary to use a time equal to about 6–8 half-lives of the peroxy agent.

It has been discovered that crosslinked polymeric compositions prepared using the tris-peroxides of this invention essentialy do not develop a bloom on aging and exhibit no residual odor caused by the decomposition of the peroxide.

Embodiments and comparative formulations

Embodiments of crosslinkable (vulcanizible) compositions, crosslinked (vulcanized) compositions, and the heat curing thereof are set out hereinafter.

The ingredients of these formulations were milled to an intimate plastic mixture on a standard roll mill, such as used in the rubber industry. The temperature of the mix during milling was held below 250° F. At these conditions no scorching occurred.

The intimately mixed vulcanizible mass was removed from the roll mill and a portion placed in a mold in a hydraulic press and heat cured. The curing times and temperatures were varied depending upon the peroxy crosslinking agent and the polymeric material used.

Immediately upon removal from the curing press, the cured slabs were permitted to mature at room temperature for about 24 hours. This maturing time was sufficient to give reproducible results.

The matured slabs were then cut into dumbell shaped speciments and tested for tensile strength on an Instron Tensile Tester, following ASTM procedure as prescribed in D412–61T, "Tension Testing of Vulcanized Rubber."

The target for commercial quality cured EPR composition was a 300% modulus of 1500±100 p.s.i.

In the following tables illustrating the crosslinking or vulcanizing ability of the tris peroxides, the following abbreviations of the proper chemical names will be used:

1,3,5-tris[alpha,alpha-dimethyl-alpha-alpha-(t-butyl-peroxy)methyl]benzene=tris-t-BP
1,4-bis[alpha,alpha-dimethyl-alpha-(t-butylperoxy)methyl]benzene=bis-t-BP
Bis[alpha,alpha-dimethylbenzyl]peroxide=DiCup

TABLE I.—VULCANIZATION OF ETHYLENE PROPYLENE RUBBER FORMULATION

EPR 404,[1] 100 parts
SRF carbon black, 60 parts
Sulfur, .3 part

| Peroxide | Tris-t-BP | Bis-t-BP | DiCup |
|---|---|---|---|
| Parts | 2.34 | 2.54 | 2.70 |
| Cure temperature, ° F | 340 | 340 | 340 |
| Cure time, min | 20 | 20 | 20 |
| Shore hardness | 58 | 58 | 55 |
| 300% modulus, p.s.i | 1,962 | 1,855 | 1,283 |
| Ultimate tensile, p.s.i | 2,102 | 1,945 | 1,930 |
| Percent elongation | 315 | 307 | 420 |
| Odor | None | None | [2] Yes |
| Blooming | None | Yes | None |

[1] Enjay Chemical Co.—40:60 ethylene:propylene content; no oil extender.
[2] Due to decomposition products such as acetophenone.

TABLE II.—VULCANIZATION OF URETHANE RUBBER FORMULATION

Genthane S,[1] 100 parts
HAF carbon black, 25 parts
Stearic acid, 0.2 part

| Peroxide | Tris-t-BP | Bis-t-BP |
|---|---|---|
| Parts | 2.34 | 2.54 |
| Cure temperature, ° F | 310 | 310 |
| Cure time, min | 60 | 60 |
| Shore hardness | 60 | 52 |
| Compression set | 9.6 | 42.6 |
| 300% modulus, p.s.i | 2,682 | 664 |
| Ultimate tensile, p.s.i | 4,707 | 2,412 |
| Percent elongation | 433 | 725 |
| Blooming | None | Yes |

[1] General Tire and Rubber Co. (Chemicals & Plastics Division).

It is seen from the physical properties shown above that the tris peroxide gives a better cure than the bis peroxide in urethane rubber at equal active oxygen concentration.

TABLE III.—CROSSLINKING OF POLYETHYLENE

[Bakelite DYNH–1, 100 parts][1]

| Peroxide | Tris-t-BP | | Bis-t-BP | | DiCup | |
|---|---|---|---|---|---|---|
| Parts | 2.34 | | 2.54 | | 2.7 | |
| Cure temperature, ° F | 320 | 340 | 320 | 340 | 320 | 340 |
| Cure time, min | 30 | 30 | 30 | 30 | 30 | 30 |
| Percent crosslinking [2] | 89.5 | 92.7 | 84.0 | 89.0 | 90.5 | 89.5 |
| Blooming | None | None | Yes | Yes | None | None |
| Odor | None | None | None | None | Yes | Yes |

[1] Union Carbide Plastics Division.
[2] The percent crosslinking was determined by the ASTM solvent extraction procedure. The polyethylene charge had zero crosslinking.

Others

The tris 1,1,3,3-tetramethylbutyl and ethyl peroxy derivatives, Compounds III and IV, were also tested and found to be effective crosslinking agents, which did not have any odor and blooming development in the cured polymeric materials.

Thus having described the invention, what is claimed is:

1. Peroxide having the formula:

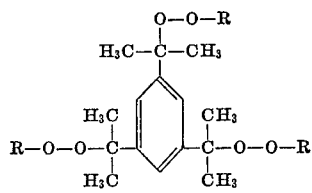

where R is an alkyl radical having from 1 to 8 carbon atoms.

2. The peroxide of claim 1 wherein R is a tertiary-alkyl radical having from 4 to 8 carbon atoms.

3. 1,3,5 - tris[alpha,alpha - dimethyl - alpha - (t - butyl-peroxy)methyl]benzene.

4. 1,3,5 - tris[alpha,alpha - dimethyl - alpha - (1,1,3,3-tetramethylbutylperoxy)methyl]benzene.

5. 1,3,5-tris[alpha,alpha-dimethyl-alpha-(ethylperoxy)methyl]benzene.

References Cited

UNITED STATES PATENTS 2,790,010  4/1957  Shepard _____ 260—610

LEON ZITVER, *Primary Examiner.*

W. B. LONE, *Assistant Examiner.*

U.S. Cl. X.R.

260—41, 77.5, 79.5, 88.2, 94.9

Disclaimer 3,420,891.—*Orville Leonard Mageli*, Buffalo, and *Richard Anthony Bafford*, Tonawanda, N.Y. TRIS-PEROXIDES FROM 1,3,5-TRIISOPROPYLBENZENE. Patent dated Jan. 7, 1969. Disclaimer filed Dec. 18, 1970, by the assignee, *Pennwalt Corporation*.

Hereby enters this disclaimer to claims 1–5 of said patent.

[*Official Gazette August 24, 1971.*]